United States Patent

Hanada et al.

Patent Number: 5,192,380
Date of Patent: Mar. 9, 1993

[54] PNEUMATIC RADIAL TIRE FOR PASSENGER VEHICLE INCLUDING A PARTICULAR CARCASS LINE

[75] Inventors: Ryoji Hanada, Isehara; Masaki Noro, Hiratsuka; Yukimasa Minami, Hiratsuka; Motohide Takasugi, Hiratsuka, all of Japan

[73] Assignee: The Yokohama Rubber Co., Ltd., Tokyo, Japan

[21] Appl. No.: 622,568

[22] Filed: Dec. 5, 1990

[30] Foreign Application Priority Data

Dec. 19, 1989 [JP] Japan ................................. 1-327420

[51] Int. Cl.$^5$ ............................ B60C 3/00; B60C 9/02; B60C 9/08
[52] U.S. Cl. ........................................ 152/454; 152/548
[58] Field of Search ............................. 152/454, 548

[56] References Cited

U.S. PATENT DOCUMENTS

4,527,606  7/1985  Kita et al. .................. 152/454 X

OTHER PUBLICATIONS

"Bohn, Zur Statik und Dynamik des Gurtelreifens", pp. 255-261 ATZ 69 (1967) 8.

Primary Examiner—Caleb Weston
Assistant Examiner—Adrienne C. Johnstone
Attorney, Agent, or Firm—Nikaido, Marmelstein, Murray & Oram

[57] ABSTRACT

A pneumatic radial tire for a passenger vehicle, characterized in that at least a portion of a carcass line extending radially outwardly from the maximum width position in a carcass line of a tire fitted to a normal rim and inflated up to its normal internal pressure is configured so as to substantially conform to an equilibrium carcass line expressed by the following equations (1) and (2) calculated by using an internal pressure allotment ratio g(y) of a carcass layer at the tread portion that is obtained by setting the distributional configuration index $\alpha$ of the following equation (3) at 4 or more, and that a tread pattern having a directional property is provided to the tread surface thereof, wherein:

in $y_D \leq y \leq y_A$, $$r_1 = \frac{\int_{y_D}^{y_A} g(y) \cdot y \, dy + (y_D^2 - y_C^2)/2}{g(y) \cdot y} \quad (1)$$

in $y_B \leq y \leq y_D$, $$r_1 = \frac{\int_{y_D}^{y_A} g(y) \cdot y \, dy + (y_D^2 - y_C^2)/2}{y} \quad (2)$$

$$g(y) = \frac{1 - \eta}{(y_D - y_A)} (y - y_A)^\alpha + \eta \quad (3)$$

wherein, provided that a line drawn vertically downwardly from the center of the tread portion to the axle of the tire is y axis of coordinates with the axle of the tire being z axis of coordinates, $y_A$, $y_D$, $y_C$, $y_B$ and $\eta$ denote as follows:

$y_A$: y axis of coordinates for the carcass line at the center of the tread portion;
$y_D$: y axis of coordinates for the carcass line at the effective width end portion of the belt layer;
$y_C$: y axis of coordinates for the carcass line at the maximum width position in a tire carcass line;
$y_B$: y axis of coordinates for the carcass line at the bead portion; and
$\eta$: the internal pressure allotment ratio of the carcass layer at the center of the tread portion.

4 Claims, 4 Drawing Sheets

PNEUMATIC RADIAL TIRE FOR PASSENGER VEHICLE INCLUDING A PARTICULAR CARCASS LINE

BACKGROUND OF THE INVENTION

The present invention relates to a pneumatic radial tire (hereinafter referred to as a radial tire) for a passenger vehicle, and more particularly, to a radial tire which is superior in steering stability on a dry road (hereinafter referred to as dry performance) and which improves the wet performance.

Heretofore, with a view to improving the durability of the belt portion and to reducing the rolling resistance, radial tires have been proposed in which the carcass line is defined by an "equilibrium carcass line".

This equilibrium carcass line means a natural equilibrium configuration of a carcass layer formed as a result of the balance between the normal internal pressure of a tire and a reaction force generated in an area where the carcass layer and a belt layer overlap with each other and the tension of the carcass layer in a condition wherein no substantial force other than the normal internal pressure and the reaction force acts on the tire when the tire is inflated up to its normal internal pressure.

For instance, British patent specification No. GB 2,006,695B proposes the improvement of the durability by providing the equilibrium carcass line such that a natural equilibrium configuration formed when no substantial force other than the internal pressure of the tire acts thereon is exhibited in an area extending from the maximum width position of the carcass layer toward the bead portion when the tire is inflated, and that a theoretical equilibrium configuration formed when no substantial force other than the internal pressure and the reaction force of the belt layer acts thereon is exhibited in the remaining area extending from the maximum width position toward the tread. In addition, the specification of the U.S. Pat. No. 4,513,802 proposes the reduction of the rolling resistance by increasing the height of the sidewall of the maximum width position of a tire.

However, in each of these proposals, it is intended to control the distribution of tension of carcass cords, and it is not intended to control the distribution of tension of belt cords, which the present invention proposes to control as hereinafter described. Therefore, the belt tension generated when radial tires proposed in the above cited Patent specifications were inflated up to their normal internal pressures becomes greater at the ground-contacting central portion of the tread portion, but gradually decreases toward the shoulder side end portions, and the apparent rigidity decreases. Because of this, it was not possible to improve the steering stability and wear resistance while driving to turn. Furthermore, the width of grooves in the tread portion is reduced by the side force generated while driving to turn, and therefore it as not possible to avoid the deterioration of the wet performance.

In a radial tire for a passenger vehicle, although it is common that a tread pattern is determined so as to be symmetrical with respect to the center of the tread, the Japanese patent application Kokai publication No. 60-45404 proposes a tire provided with a tread pattern having a direction property with a view to improving the wet performance. However, this tread pattern having a direction property can improve the wet performance compared to the dot-symmetrical tread pattern without a direction property, but since the belt tension of the shoulder portions is not increased, the width of grooves at the shoulder portions is reduced when driving on a corner, and therefore it is not possible to greatly improve the wet performance.

SUMMARY OF THE INVENTION

An object of the present invention is to provide a pneumatic radial tire for a passenger vehicle that greatly improves the wet performance together with the dry performance and wear resistance.

In a radial tire according to the present invention that can fulfill the above object, at least a portion of a carcass line extending radially outwardly from the maximum width position in a carcass line of a tire fitted to a normal rim and inflated up to its normal internal pressure is required to substantially conform to an equilibrium carcass line expressed by the following equations (1) and (2) calculated by using an internal pressure allotment ration, $g(y)$, of the carcass layer in the tread portion that is obtained by setting the distributional configuration index $\alpha$ in the following equation (3) at 4 or more, and to provide a tread pattern having a direction property to the tread surface.

In $y_D \leq y \leq y_A$, $$r_1 = \frac{\int_{y_D}^{y_A} g(y) \cdot y \, dy + (y_D^2 - y_C^2)/2}{g(y) \cdot y} \quad (1)$$

in $y_B \leq y \leq y_D$, $$r_1 = \frac{\int_{y_D}^{y_A} g(y) \cdot y \, dy + (y_D^2 - y_C^2)/2}{y} \quad (2)$$

$$g(y) = \frac{1 - \eta}{(y_D - y_A)} (y - y_A)^\alpha + \eta \quad (3)$$

wherein, provided that a line drawn vertically downwardly from the center of the tread portion to the axle of the tire is y axis of coordinates with the axle of the tire being z axis of coordinates, $y_A$, $y_D$, $y_C$, $y_S$ and $\eta$ denote as follows:

$y_A$: y axis of coordinates for the carcass line at the center of the tread portion;

$y_D$: y axis of coordinates for the carcass line at the effective width end portion of the belt layer;

$y_C$: y axis of coordinates for the carcass line at the maximum width position in a tire carcass line;

$y_S$: y axis of coordinates for the carcass line at the bead portion; and $\eta$: the internal pressure allotment ratio of the carcass layer at the center of the tread portion.

When used in relation to the tire according to the present invention, a normal rim and a normal internal pressure mean those defined in accordance with the types of tires in the standard of Japan Automibile Tire Manufacturers' Association (JATMA).

In addition, a tread pattern having a direction property means a pattern comprising a plurality of main grooves extending in the circumferential direction of the tire and a plurality of sub-grooves connecting the main grooves and extending toward the shoulder ends, the sub-grooves being bent convexedly toward the rotational direction of the tire so that they become symmetrical with respect to the center line of the tread.

In addition, a carcass line means a curved configuration formed by a center line of a carcass layer in a cross-section of the tire cut in the direction of the meridian line thereof.

DETAILED DESCRIPTION OF THE PREFERRED EMBODIMENTS

Figure 1:
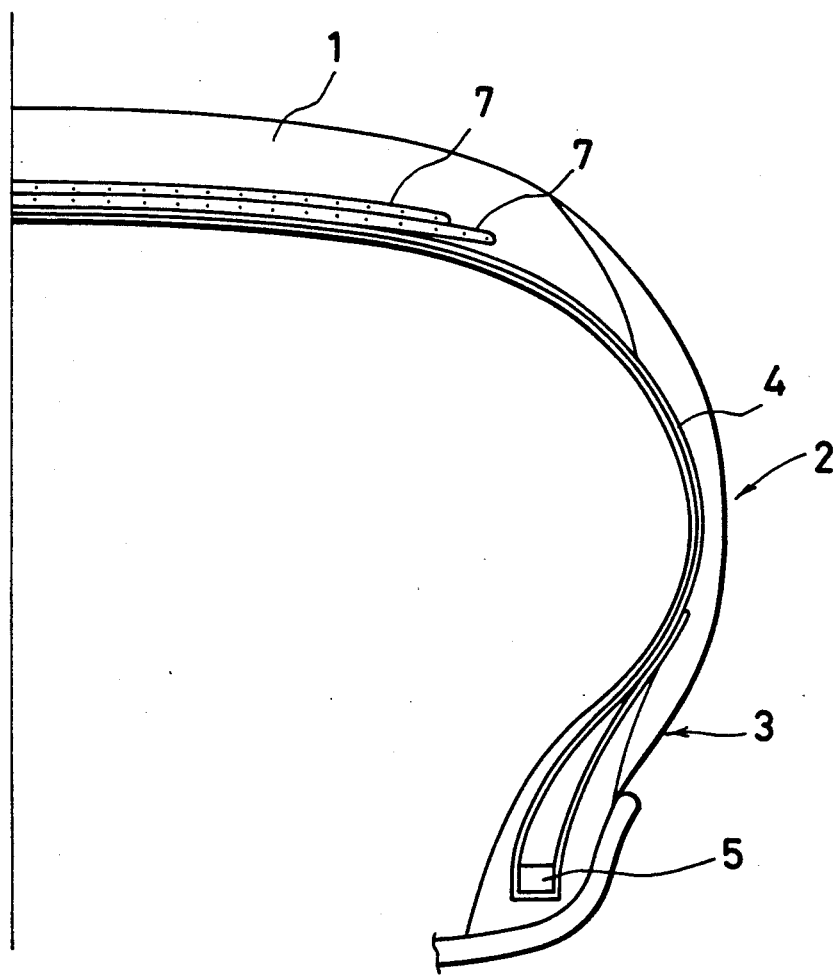
FIG. 1 is a half-cut cross-sectional view showing an example of a tire according to the present invention.

FIG. 1 shows an example of a radial tire according to the present invention, and it comprises a pair of left and right bead portions 3, a pair of left and right sidewall portions 2 that continuously extend from the bead portions 3, respectively, and a tread portion 1 continuously extending to the respective sidewall portions 2. The ends of a carcass layer 4 are folded over around bead cores 5 of the bead portions 3 from the inside of the tire to the outside thereof, and two belt layers 7 extending in the circumferential direction of the tire are provided at the tread portion 1 of this carcass layer 4.

For a tire for a passenger vehicle, organic fibers such as of nylon, rayon and polyester are commonly used for carcass cords constituting the carcass layer, and cords having a high elastic modulus such as steel cords and aramid fiber cords are used as belt cords constituting the belt layer 7. When required, a belt cover layer having a cord angle of 0° with respect to the circumferential direction of the tire and comprising nylon cords may be disposed on the surface of the belt layer 7.

There are many known theoretical equations for calculating an equilibrium carcass line, and in the present invention, the equilibrium carcass line is defined by using the afore-mentioned equations (1), (2) and (3) developed by F. Böhm that are most frequently used of those known equations. The details of these theoretical equations are described in ATZ 69 (1967), "Zur Statik and Dynamik des Gürlelreifens".

In the theoretical equations of F. Böhm, it is understood that the internal pressure is alloted and borne by two layers, a belt layer and a carcass layer in the tread portion, and provided that the allotment ratio borne by the carcass layer is g(y), since the internal pressure borne by the carcass layer is P·g(y) with the internal pressure borne by the belt layer being P·[1−g(y)], the internal pressure P is expressed by:

$$P = [p \cdot g(y)] + [P \cdot (1 - g(y))] \quad (4)$$

The g(y) is a function representing the internal pressure allotment ratio of the carcass layer extending from the center of the tread portion toward the side (shoulder) portions and is expressed by the equation (3) above.

In a case where the internal pressure allotment at the tread portion borne by the belt and carcass layers is expressed by the above equation (4), the configuration of the equilibrium carcass line at the tread portion is a continuity of arcs having radius curvatures $r_1$ expressed by the above equations (1) and (2).

Figure 2:
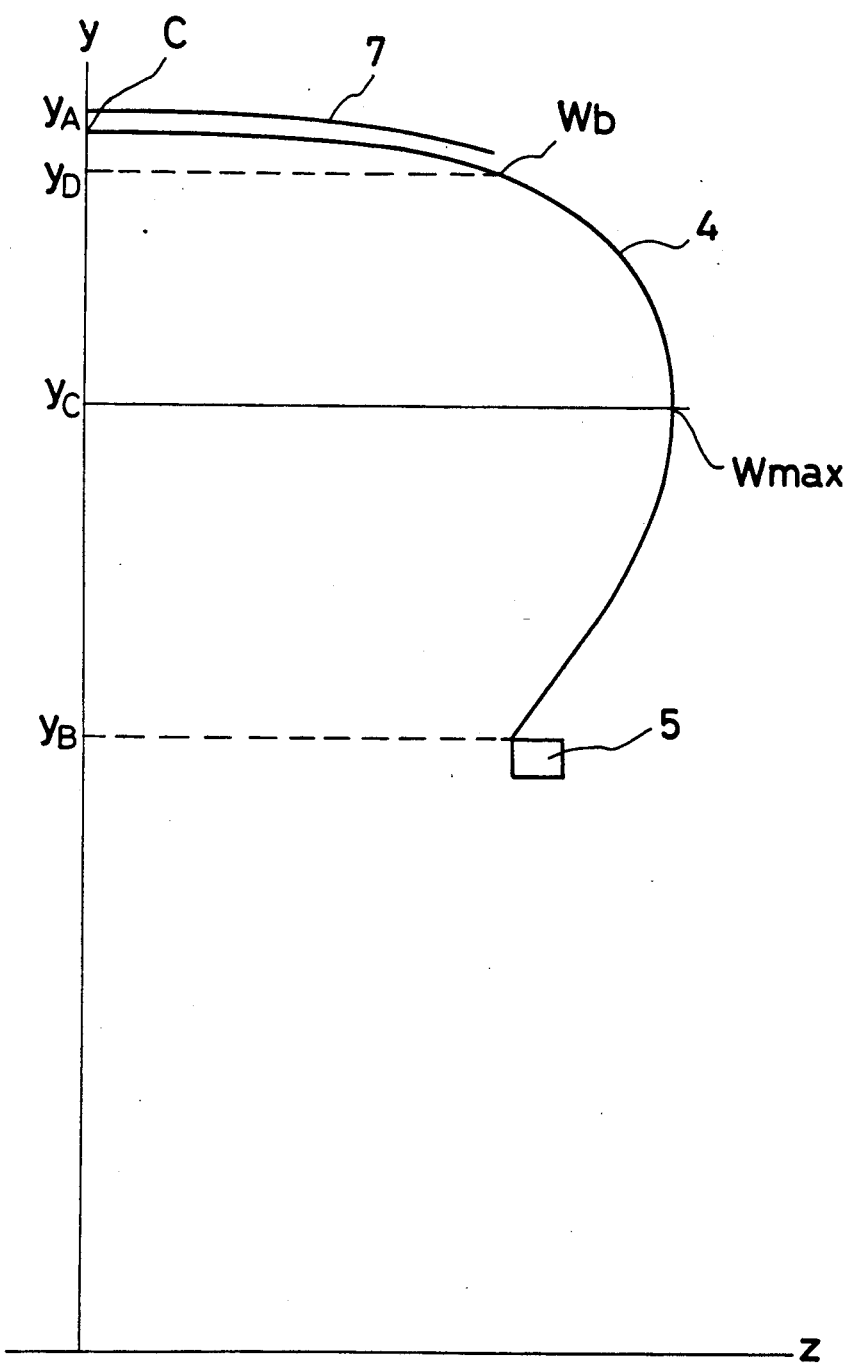
FIG. 2 is a view showing the equilibrium carcass line of the tire according to the present invention in the form of coordinates.

In these equations (1) and (2), as shown in FIG. 2, provided that a line drawn down to the axle of the tire from the center C of the tread portion is y axis of coordinates with the axle of the tire being z axis of coordinates, $y_A$ denotes y axis of coordinates for the carcass line at the center C of the tread portion, $y_D$ denoting y axis of coordinates for the carcass line at the end portion Wb of the effective belt width, $y_C$ denoting y axis of coordinates for the carcass line at the maximum width position Wmax, $y_B$ denoting y axis of coordinates for the carcass line at the bead portion, and $\eta$ denoting the internal pressure allotment ratio of the carcass layer at the center C of the tread portion.

Therefore, the equilibrium carcass line based on the equations of (1) and (2) can be directly determined by determining the g(y) of the equation (3).

It is common heretofore to use as the g(y) of a conventional tie a quadratic function in which the distributional configuration index $\alpha$ in the equation (3) is 2 from a calculation result based on the finite element method and experimental results. In contrast, in the present invention, a function of higher order is used in which the distributional configuration index $\alpha$ in the equation (3) is 4 or more, preferably 4 to 8. As is clear from the equations (3) and (4), since it is possible to increase the internal pressure allotment ratio even at the side portions compared with the case where the conventional quadratic function in which $\alpha$ is 2 is used by making $\alpha$ 4 or more as described above, whereby the reduction of the belt tension at the shoulder portions is made small, the apparent rigidity at the shoulder portions of the belt layer can be made greater.

Figure 3:
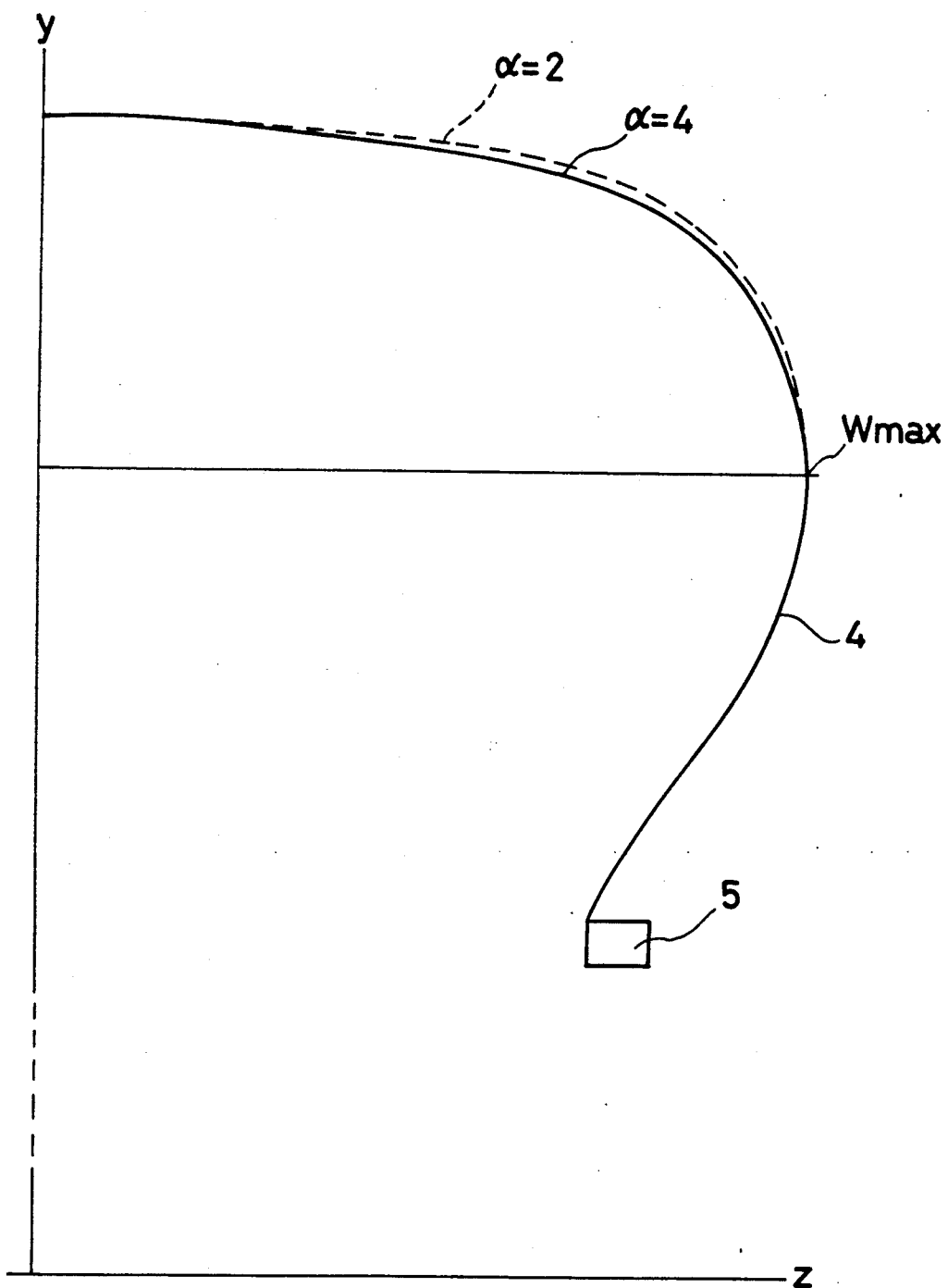
FIG. 3 is a half-cut cross-sectional view showing comparatively examples of the equilibrium carcass lines of the tire according to the present invention and a conventional tire.

FIG. 3 shows a continuity comprising arcs made based on the radius of curvatures calculated from the above equations (1) and (2), i.e., the configuration of the equilibrium carcass line. The solid line shows the carcass line of the tire of the present invention in which $\alpha$ is 4, while the dotted line shows the carcass line of the conventional tire in which $\alpha$ is 2. It will be seen when comparing the two carcass lines of the tire of the present invention and the conventional tire in FIG. 3 that the radius of curvature of the former gradually decreases toward the shoulder portion.

Thus, in the configuration of the equilibrium carcass line of the tire according to the present invention, since the belt tension in the shoulder portions can be increased, thereby making it possible also to increase the apparent rigidity of the belt layer, the cornering power can be increased, thereby making it possible to improve the steering stability when driving to turn. Furthermore, since the movement of tread blocks at the shoulder portions can be restricted due to the increase of the belt tension, it is possible to improve wear resistance.

Figure 4:
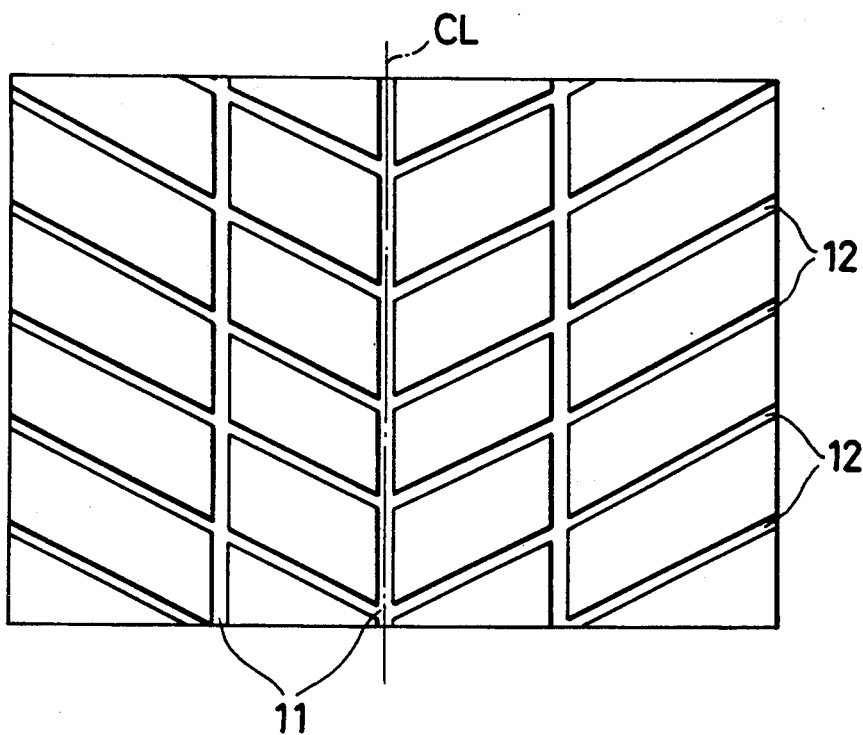
FIG. 4 is a plane view showing an example of the tread pattern of the tire according to the present invention.

In addition, as shown in FIG. 4, the tire of the present invention is provided in the tread surface thereof with a tread pattern having a direction property with respect to the circumferential direction of the tire by disposing main grooves 11 and sub-grooves 12 symmetrically with respect to the center line CL of the tread. Since this tread pattern having a direction property is superior to a tread pattern without a direction property shown in FIG. 5 in water drainage capability, the wet performance of the tire can be improved. Therefore, the wet performance of the tire according to the present invention can be greatly improved by virtue of synergistic effects of the tread pattern having a direction property and the afore-mentioned structure of the carcass line in which the variation of the width of grooves at shoulder portions is made small.

The tire of the present invention as described above is manufactured through the following procedure.

First, an equilibrium carcass line is obtained by calculating radius of curvature $r_1$ from the equations (3), and (1) and (2) with the distributional configuration index $\alpha$ of the carcass internal pressure allotment ratio being set at 4 or more. Then, the configuration of a carcass line is set such that the equilibrium carcass line so obtained conforms to the configuration of the portions extending radially outwardly from the maximum width position in the tire carcass line, and a predetermined padding is applied thereto, thereby determining the configuration of a mold. Following this, a tire mold having this mold configuration provided with a tread pattern having a predetermined direction property is made. A green tire having a targeted structure is made, and molding and vulcanization are carried out using the above tire mold.

A mold conforming to the carcass line of the tire of the present invention is prepared by applying plaster on the circumference of the tire after inflating the tire up to its normal internal pressure, and leaving the same in its inflated state so that the tire configuration is stabilized. The carcass line of the tire generated when the tire is inflated can be specified by cutting the tire in the radial direction and by drawing the cross-sectional configuration of the tire in such a manner as to let the external configuration of the tire follow a mold which is prepared as described above.

As described above, according to the present invention, since a portion of the carcass line extending radially outwardly from the maximum width position in the carcass line of the tire fitted to a normal rim and inflated up to its normal internal pressure is configured so as to substantially conform to the equilibrium carcass line expressed by the aforementioned equations (1) and (2) calculated using the internal pressure allotment ration, $g(y)$, of the carcass layer in the tread portion that is obtained by setting the distributional configuration index $\alpha$ of the euqation (3) at 4 or more, it is possible to increase the belt tension at the shoulder portions, thereby making it possible to increase the apparent rigidity of the belt layer. This serves to improve the steering stability when driving on a corner, thereby making it possible to improve wear resistance. Furthermore, since there is provided in the tread surface a tread pattern having a direction property, the water drainage property can be improved, and the variation of the width of grooves at the shoulder portions can also be restricted due to the increase of the apparent rigidity of the belt layer, thus making it possible to greatly improve the wet performance.

Referring to an example, the present invention will be described more concretely.

EXAMPLE

The following four types of radial tires were prepared, which had a same tire size of 195/65 R 15.

Tire of the Present Invention

The belt layers, carcass layer, carcass configuration and tread pattern of this tire are as follows:

Belt Layer

Steel cords of 1×5 (0.25) were bias-laminated at an angle of 24° to the circumferential direction of the tire with an end count of 40 per 50 mm.

Carcass Layer

Polyester fiber cords of 1000 D/2 were disposed at an angle of 90° to the circumferential direction of the tire with an end count of 55 per 50 mm.

Carcass Line Configuration

At least a portion of the carcass line extending radially outwardly from the maximum width position in the carcass line of the tire fitted to a normal rim and inflated to its normal internal pressure was configured so as to conform to the equilibrium carcass line calculated from the equations (3), (1) and (2) with the distributional configuration index $\alpha$ of the carcass internal pressure allotment ratio $g(y)$ being set at 4.

Tread Pattern

A tread pattern as shown in FIG. 4 was formed.

Conventional Tire I

This tire had the same construction as that of the tire of the present invention except that the carcass line configuration and the tread pattern were changed as follows.

Carcass Line Configuration

At least a portion of the carcass line extending radially outwardly from the maximum width position in the carcass line of the tire fitted to a normal rim and inflated to its normal internal pressure as configured so as to conform to the equilibrium carcass line calculated from the equations (3), (1) and (2) with the distribution configuration index $\alpha$ of the carcass internal pressure allotment ratio $g(y)$ being set at 2.

Tread Pattern

Figure 5:
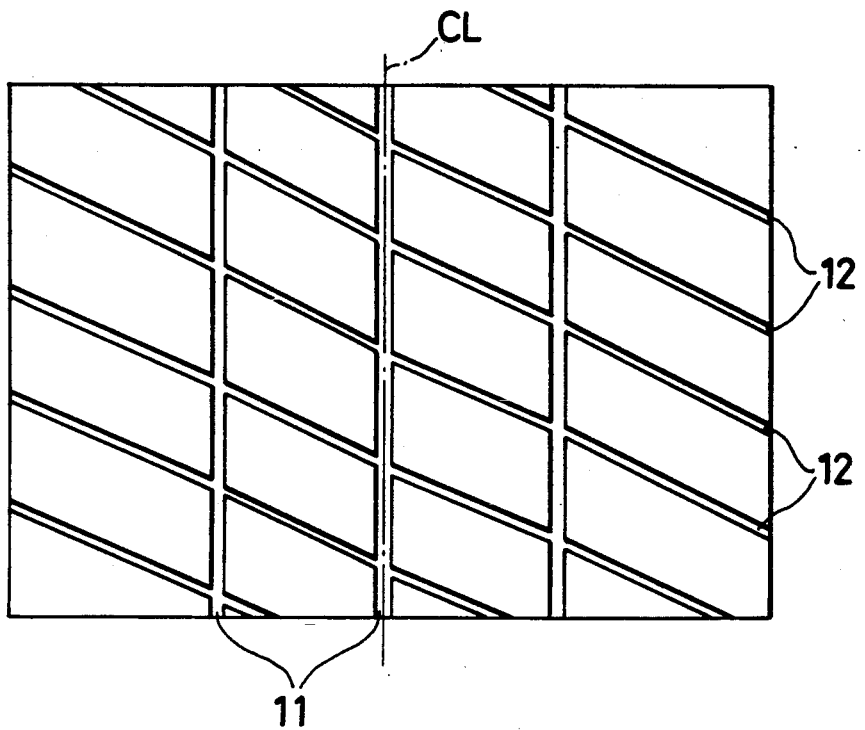
FIG. 5 is a plane view showing a tread pattern of a conventional tire.

A tread pattern as shown in FIG. 5 was formed (however, the groove area was made the same as that of the tire of the present invention).

Conventional Tire II

This tire had the same construction as that of the Conventional Tire I except that the tread pattern was changed to a one having a direction property as shown in FIG. 4 and that the groove area thereof was made 120% of that of Conventional Tire I.

Conventional Tire III

This tire had the same construction as that of the tire of the present invention except that the tread pattern was changed to a one as shown in FIG. 5 (however, the groove area was made the same as that of the tire of the present invention).

Using the following measuring methods, the four types of tires were rated in terms of the condition in which hydroplaning was generated, and the cornering power as dry performance.

Hydroplaning Test

The test tires were fitted to rims of 15×5½ JJ, and were filled with air under an air pressure of 1.9 kg/cm². Then, these tires were fitted to domestic automobiles having a front-engine rear-drive layout, and the automobiles were driven at a certain speed on a circular course with a radius of 100 m having a 10 m long wet area with a water depth of 5 mm, and the speed at which the lateral acceleration G became maximum while passing through the wet area was measured.

Cornering Power

The test tires were fitted to rims of 15×5½ JJ, and were filled with air under an air pressure of 1.9 kg/cm². Using a flat belt type cornering test machine made by MTS Corporation, a cornering power when loaded with a load of 505 kg (replaced with a cornering force when the slip angle is 1) was measured.

The above measured results were shown in the form of index, taking the measured values of the Conventional Tire I as 100 in each test. Greater indexes show better dry and wet performances.

|  | Conventional Tire I | Tire of Present Invention | Conventional Tire II | Conventional Tire III |
|---|---|---|---|---|
| α | 2 | 4 | 2 | 4 |
| Dry Performance | 100 | 105 | 90 | 105 |
| Wet Performance | 100 | 135 | 115 | 115 |

As will be seen from the table above, the tire of the present invention is superior to Conventional Tires, I, II and III in the dry and wet performances, and in particular the improvement of the wet performance is remarkable.

What is claimed is:

1. A pneumatic radial tire for a passenger vehicle, characterized in that at least a portion of a carcass line extending radially outwardly from the maximum width position in a carcass line of a tire fitted to a normal rim and inflated up to its normal internal pressure is configured so as to substantially conform to an equilibrium carcass line expressed by the following equations (1) and (2) calculated by using an internal pressure allotment ratio g(y) of a carcass layer at the tread portion that is obtained by setting the distributional configuration index α of the following equation (3) at 4 or more, and that a tread pattern having a direction property is provided to the tread surface thereof, wherein:

in $y_D \leq y \leq y_A$, $$r_1 = \frac{\int_{y_D}^{y_A} g(y) \cdot y \, dy + (y_D^2 - y_C^2)/2}{g(y) \cdot y} \quad (1)$$

in $y_B \leq y \leq y_D$, $$r_1 = \frac{\int_{y_D}^{y_A} g(y) \cdot y \, dy + (y_D^2 - y_C^2)/2}{y} \quad (2)$$

$$g(y) = \frac{1 - \eta}{(y_D - y_A)} (y - y_A)^\alpha + \eta \quad (3)$$

wherein, provided that a line drawn vertically downwardly from the center of the tread portion to the axle of the tire is y axis of coordinates with the axle of the tire being z axis of coordinates, $y_A$, $y_D$, $y_C$, $y_B$ and $\eta$ denote as follows:

$y_A$: y axis of coordinates for the carcass line at the center of the tread portion;

$y_D$: y axis of coordinates for the carcass line at the effective width end portion of the belt layer;

$y_C$: y axis of coordinates for the carcass line at the maximum width position in a tire carcass line;

$y_B$: y axis of coordinates for the carcass line at the bead portion; and $\eta$: the internal pressure allotment ratio of the carcass layer at the center of the tread portion.

2. A pneumatic radial tire as set forth in claim 1, wherein said distributional configuration index α is set to 4 to 8.

3. A pneumatic radial tire as set forth in claim 1, wherein carcass cords constituting said carcass layer are organic fiber cords.

4. A pneumatic radial tire as set forth in claim 3, wherein said organic fiber cords are selected from the group consisting of nylon cords, rayon cords and polyester cords.

* * * * *